Figure 9:
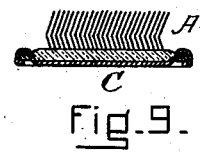

No. 693,817. Patented Feb. 18, 1902.
C. MILLS & R. W. HUNTON.
CARD CLOTHING.
(Application filed Jan. 12, 1901.)
(No Model.) 2 Sheets—Sheet 1.
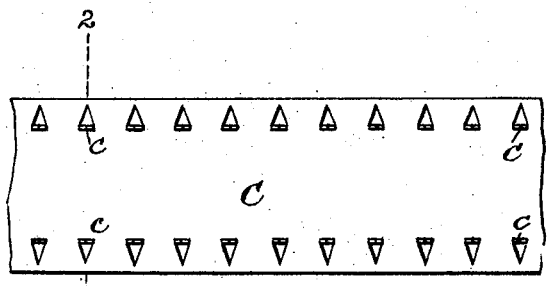
Fig. 1.
Fig. 2.
Fig. 3.
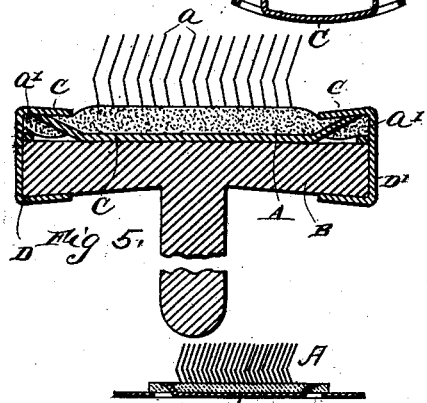
Fig. 5.
Fig. 4.
Fig. 6.
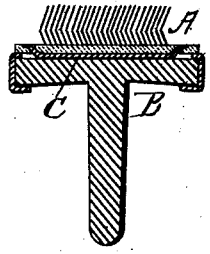
Fig. 7.
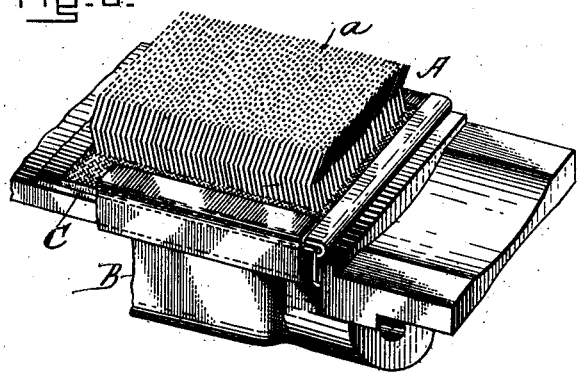
Fig. 8.
WITNESSES: INVENTORS:

No. 693,817. Patented Feb. 18, 1902.
C. MILLS & R. W. HUNTON.
CARD CLOTHING.
(Application filed Jan. 12, 1901.)

(No Model.) 2 Sheets—Sheet 2.

WITNESSES:
L. M. Dolan
Saul Sipperstein

INVENTORS:
Chas. Mills
Robt. W. Hunton
by their atty. Charles Raymond

THE NORRIS PETERS CO., PHOTO-LITHO., WASHINGTON, D. C.

UNITED STATES PATENT OFFICE.

CHARLES MILLS AND ROBERT W. HUNTON, OF NEWTON, MASSACHUSETTS, ASSIGNORS TO THE SACO & PETTEE MACHINE SHOPS, OF NEWTON, MASSACHUSETTS, A CORPORATION OF MASSACHUSETTS.

CARD-CLOTHING.

SPECIFICATION forming part of Letters Patent No. 693,817, dated February 18, 1902.

Application filed January 12, 1901. Serial No. 43,042. (No model.)

*To all whom it may concern:*

Be it known that we, CHARLES MILLS and ROBERT W. HUNTON, citizens of the United States, and residents of Newton, in the county of Middlesex and State of Massachusetts, have invented a new and useful Improvement in Card-Clothing, of which the following is a full, clear, and exact description, reference being had to the accompanying drawings, forming a part of this specification, in explaining its nature.

The invention relates to the improvement in card-clothing for the flats of carding-engines comprising the use, in connection with the ordinary clothing, of a metallic stretching and backing plate, which is provided with means for engaging the edges of the card-clothing from its back side, and is also adapted to be changed in structure or shape, so that the said points of attachment to the edges of the card-clothing shall be separated from each other more and the card-clothing stretched by the said change in structure or shape of the plate. The plate being upon the back side of the clothing when imperforate also serves as a backing for the clothing and for its wires. Making engagement with the edges of the card-clothing from the back causes the inner portions of the clothing to be stretched to as great a degree as the outer portions, thereby insuring the maintenance of the wire teeth in their original parallel relation to each other. In other words, they are so held during the attachment of the plate to the clothing and during the stretching of the clothing and are not separated at their outer ends more or less, as often occurs when the clothing is attached by clips, which extend upon their outer surfaces and make engagement with the clothing from its outer side. The stretching and backing plate may also be used for attaching the stretched clothing to the flat and for binding the flat. The product is clothing which is stretched and held stretched by the plate which supports it and before it is attached to the flat, so that the act of securing the clothing to the flat does not involve the act of stretching the clothing at that time, as it is then already in stretched condition, the fastening of the stretched clothing to the flat requiring only the application of fastening-clips or other means to the stretched clothing or its backing-plate and to the flat.

We will now describe our invention in detail in connection with the drawings, wherein—

Figure 10:
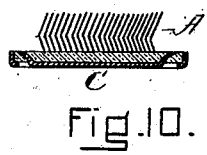
Figure 11:
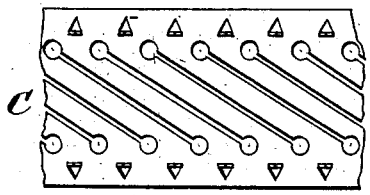
Figure 12:
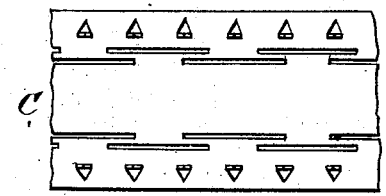
Figure 13:
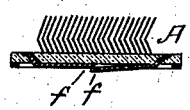
Figure 14:
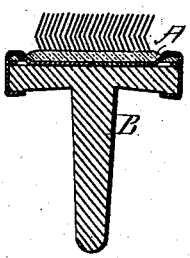

Figure 1 is a view in plan of one type of the stretching-plate. Fig. 2 is a view of the plate in cross-section upon the dotted line 2 2 of Fig. 1, also showing a section of the card-clothing above it. Fig. 3 is a view in section through the clothing and the plate, the edges of the plate being represented as attached to the edges of the clothing and the clothing being in its unstretched condition. Fig. 4 shows the clothing as stretched by the plate, the plate and the clothing being attached by their edges, and the plate also serving to hold the clothing stretched. Fig. 5 is an enlarged sectional view of a flat stretching-plate, stretched clothing, and clips fastening the stretched clothing and stretching-plate to the flat. Fig. 6 is a view representing the stretching-plate and the stretched clothing united, the plate also having means by which it and the clothing are attached to the flat. Fig. 7 is a view in section representing the flat, the stretched clothing, and the stretching-plate, the extensions of the stretching-plate securing it and the stretched clothing to the flat. Fig. 8 is a view in perspective, enlarged, of the end of a flat, the clothing, the stretching-plate, and fastening-clips. Fig. 9 represents the stretching-plate as provided with extensions which are bent over the side edges of the clothing and upon its upper surface to protect said edges. Fig. 10 is a view of the same parts, the extensions of the stretching-plate being turned up upon the side edges of the clothing, but not extending upon the outer surface thereof. Fig. 11 is a view of a modified form of stretching-plate. Figs. 12, 13, and 14 illustrate still another modification of the stretching-plate, and Figs. 15 to 17 still another form.

In the drawings, A represents the card-clothing for a flat B. The clothing is of common construction, has the wires $a$ and edges $a'$.

C is the stretching and backing plate. It has along its edges means for its attachment by its edges to the edges of the card-clothing, and we have represented as such means of attachment the lines of starts or prongs c, which are near its outer edges, are preferably integral with the plate and struck up from its substance, and which are adapted to enter the edges of the clothing from its back side and extend through said edges and be bent at their ends over upon the outer surface of the clothing and outward and inward toward its edges. (See Fig. 3.) The stretching and backing plate is, before its application to the clothing, so shaped that the lines of prongs are closer to each other than they are when the plate has been changed in shape or structure by which they are separated sufficiently to stretch the clothing, and we have represented as one means for accomplishing this purpose a plate made concave on its upper side, or the side which backs against the back of the clothing, and convex upon its under side. (See Figs. 1 to 7, inclusive.) We prefer in applying it to the clothing to make the engagement by its pronged edges with the edges of the clothing and at the same time to flatten the plate, and thus cause the lines of prongs or attaching devices to be separated from each other enough more to tightly stretch and hold the clothing.

We should have said that the stretching and backing plate may be of the width of the clothing or of a greater width and is a little longer than the full length of the clothing in order that its ends $c'$, projecting beyond the ends of the clothing, may be turned outward and back upon the outer surface of the ends of the clothing, as shown in Fig. 7, and thus protect them.

In some instances the stretching and backing plate may also be employed as a means for securing the stretched clothing to the flat, and when so used the plate is made wide enough to provide extensions $c^2$, (see Fig. 5,) which are adapted to be turned down around the edges of the flat and inward upon its under surface to form what might be termed "integral" fastening-clips. (See Fig. 7.) Where the stretching and backing plate does not act to fasten the clothing to the flat, the clothing and plate may be united to the flat by means of binding-clips D D' of ordinary construction. (See Fig. 4.) These clips serve to cover and protect the edges of the clothing and of the stretching-plate, as well as to fasten the clothing and plate to the flat.

While we prefer to attach the stretching-plate to the clothing and to stretch the clothing before the clothing and plate are attached to the flat and independently of said attachment, yet it is obvious that the stretching-plate may be flattened by the flat and the clothing stretched at the time of the application and attachment of the clothing to the flat, as the flat will serve as a bed upon which the stretching-plate may be straightened during the attaching process.

In Figs. 9 and 10 we have represented the stretching-plate as provided with extensions outside the lines of prongs, which are adapted to be turned outward to protect the side edges of the clothing, and these extensions may be long enough to reach the upper surface of the clothing only as represented in Fig. 10 or to lap upon the upper surface of the clothing, as represented in Fig. 9.

Fig. 11 represents a form of stretching-plate in which the lines of prongs are caused to be separated in stretching the clothing by a slight change in the structure of the plate due to the presence in the plate of slits e, which may extend diagonally across the plate, as represented in Fig. 11, or may be arranged lengthwise the plate, as represented in Fig. 12. These slits weaken the plate and provide it with such a structure that it may be widened by separating its edges under pressure, and the structure of the plate is also such that it will remain in its widened or stretched condition.

In Fig. 13 the stretched plate is represented in two parts, the inner edges $f$ of which overlap before the stretching of the clothing, and to stretch the clothing the two parts of the plate are separated until the edges $f$ come into line with each other and abut, as represented in Fig. 14, and they are held abutted between the clothing and the surface of the flat.

Figure 15:
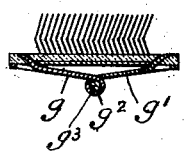
Figure 17:
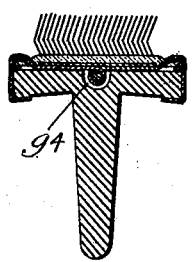
Figure 16:

In Figs. 15, 16, and 17 the stretching-plate is represented as in two longitudinal parts, which are united by a hinge. The two parts are lettered $g$ $g'$. Each part has along its outer edge prongs for making connection with the edges of the clothing. The hinge is formed in any desired way. We have represented it as secured by means of fingers $g^2$, extending from each to encircle the rod $g^3$, the fingers being spaced so that those upon one part extend between those of the other. When a hinge is employed, the flat may have a longitudinal recess $g^4$ to receive it. Of course the hinge will be on the under side of the stretching-plate, and the plate acts to stretch the clothing in the same manner that the plate of Fig. 2 acts—viz., by being flattened from a bowed form to a flat one.

We have described a few of the obvious modifications of our invention. We would not be understood as limiting it to any specified form. Neither would we be limited as to the means which may be employed for fastening the clothing and its stretching-plate to the flat, nor would we be confined as to the time in which the stretching of the clothing by the stretching-plate is done, as the clothing may be stretched by the plate prior to their attachment to the flat, in which case the clothing will be held stretched for attachment to the flat at any subsequent time, or it may be stretched by the stretching-plate at the time of attachment to the flat.

We have called the card-clothing-stretching means a "stretching-plate." We do not mean by this that it must of necessity be made in one piece, and we do not confine ourselves to a stretching-plate which is made in one piece.

It will be observed that the stretcher and holder not only has the lines of prongs c substantially parallel with its edges, but that it also has holes which are contiguous to the prongs and which when the prongs are integral with the stretcher and holder are formed in it in the act of making the prongs. The prongs, it will be seen, extend from the stretcher and holder from the surface which is brought into contact with the inner surface of the clothing. The other surface of the stretcher and holder is without prongs or projections. The prongs make engagement with the edges of the clothing and are forced apart by the stretcher and holder at the same time, so that the act of attaching the clothing to the stretcher and holder and the stretching of the clothing takes place simultaneously. The prongs may be separated from each other or pushed apart by any of the structures which we have shown and described or their equivalents. We prefer that the prongs be substantially at a right angle to the stretcher before their engagement with the edges of the clothing and during their engagement with the edges of the clothing that they be turned outward and downward within the edges of the clothing, forcing the inner surface of the clothing against the edges of the holes in the stretcher and portions of the clothing into said holes, thereby accomplishing a triple union between the stretcher and holder and the edges of the clothing in that the edges will then be held not only by the direct connection of the prongs with them due to their entering the edges of the clothing, but also by the edges of the holes against which the prongs force the inner surface of the clothing and by the portions of the clothing which are forced by the prongs into the holes. This provides a very uniform, sure, and secure attachment of the stretched clothing to the stretching-plate and holder and one that is constant throughout the length of the clothing. There is thus provided with means for stretching the clothing and holding it stretched a form of attachment to the stretcher which is positive and sure in its action, the prongs not only serving to make engagement between the stretcher and the edges of the clothing at the time of the stretching action of the stretcher, thereby permitting the stretcher to stretch the clothing by a pushing action against both the edges of the clothing, but also serving as a permanent means for maintaining the attachment between the edges of the clothing and the plate after the stretching has been accomplished. The outward turning and clenching of the prongs in the edges of the clothing serve also not only to stretch and tighten the outer surface of the clothing, but to constantly maintain it stretched and taut. When individual clips of the character represented in Figs. 5 and 17 are used for attaching the stretched clothing and its stretcher and holder to the flat and for binding their edges, an additional fastening of the edges of the stretched clothing to the holder and stretcher is obtained in that the portions of the clothing which bear upon the upper edges of the prongs are forced upon them with sufficient stress to clamp and compress them against the prongs and against the plate, thereby not only serving to clamp the portion of the edges of the clothing above the prongs against them, but also serving to hold the prongs clenched and to reinforce them in their capacity of clamping the edges of the clothing against the edges of the holes with portions in the holes, as above explained.

Having thus fully described our invention, we claim and desire to secure by Letters Patent of the United States—

1. As a means for stretching card-clothing and holding it stretched, a metal stretcher and holder of substantially the shape of the clothing, adapted to be applied to its back surface, having extending from it near each edge a line of engaging prongs which are adapted to engage the edges of the clothing and to be separated from each other in stretching the clothing and to be held apart by said metal stretcher and holder.

2. The combination of card-clothing with a metal stretcher and holder applied to the back surface of the clothing, having extending from it parallel with each edge a line of engaging prongs which engage the edges of the clothing, are separated from each other in stretching it and are held apart by the said stretcher and holder.

3. The combination of card-clothing with a metal stretcher and holder applied to the back surface of the clothing, having a line of prongs parallel with each edge thereof which enter the edges of the clothing from the back side thereof, are clenched outwardly therein and are separated and held apart by said metal stretcher and holder.

4. As a means for stretching card-clothing and holding it stretched, a concave stretching and holding plate, having a line of prongs parallel with each edge, integral therewith and extending from the concave side of the plate.

5. The combination of card-clothing with a metal stretcher and holder, the same comprising a concave plate having prongs extending from near each edge thereof which engage the edges of the clothing simultaneously with the flattening of the plate and which prongs are turned outward and clenched in said edges and whereby the plate and clothing are attached to each other and the clothing stretched as simultaneous operations.

6. The combination of card-clothing with a stretcher and holder applied to the back of the card-clothing, having fastening-prongs near each edge and holes adjacent to said fastening-prongs, the said clothing engaging said plate by means of said prongs and the edges of said holes, the prongs being turned to force the clothing against the edges of said holes, the said stretcher and holder also serving to stretch and hold stretched the clothing.

7. The combination of card-clothing and a metal holder having lines of prongs to engage the edges of the clothing and holes adjacent to said prongs, the said prongs entering the edges of the clothing and turned therein to force the clothing against the edges of the holes of the holder and into the holes thereof, whereby the clothing is fastened to the holder by the prongs, by the edges of the plate about the holes and by portions of the clothing which enter the holes.

8. The combination of card-clothing, a stretcher or holder applied to the back surface of the clothing, having two lines of prongs which enter the edges of the clothing and are turned outward therein, separated and held separated by the holder, a flat against which said stretcher and holder bear, and clips fastening the clothing, stretcher and holder and flat together.

9. The combination of card-clothing, a metal stretcher and holder, having two lines of prongs which enter the edge of the clothing, are turned outward therein, are separated and held separated by the stretcher and holder, a flat, and clips to fasten the clothing, holder and stretcher and flat together, bind the edges thereof and force the clothing against the prongs and stretcher and holder.

10. In a means for stretching card-clothing and holding it stretched, a stretcher and holder having a line of prongs parallel with each edge, integral therewith and extending from the side of the stretcher and holder against which the inner surface of the clothing is adapted to come into contact, lines of holes in said stretcher and holder contiguous to the prongs and means in said stretcher and holder for separating the lines of prongs and holes from each other.

CHAS. MILLS.
ROBT. W. HUNTON.

Witnesses:
S. A. THOMPSON,
EDWIN H. ALEXANDER.